Jan. 29, 1924.

W. H. FARR 1,482,072

THROTTLE ACTUATING DEVICE

Filed Dec. 1, 1919

Inventor
WARREN H. FARR
By his Attorneys
Blackmore, Spencer & Flint

Patented Jan. 29, 1924.

1,482,072

UNITED STATES PATENT OFFICE.

WARREN H. FARR, OF NEW YORK, N. Y., ASSIGNOR TO GENERAL MOTORS CORPORATION, OF DETROIT, MICHIGAN, A CORPORATION OF DELAWARE.

THROTTLE-ACTUATING DEVICE.

Application filed December 1, 1919. Serial No. 341,764.

*To all whom it may concern:*

Be it known that I, WARREN H. FARR, a citizen of the United States, and a resident of New York, county of New York, and State of New York, have invented certain new and useful Improvements in Throttle-Actuating Devices, of which the following is a full, clear, concise, and exact description, such as will enable others skilled in the art to which the invention relates to make and use the same, reference being made therein to the accompanying drawings, which form a part of this specification.

My invention relates to combined manual and pedal control devices for engines, and is especially designed for actuating the throttle valve of an automobile engine from the operator's position.

It is customary in control devices of this type, to provide a foot-actuated means, or accelerator, and also a hand-actuated means mounted upon the steering post, each connected to the throttle valve. It is the object of my invention to simplify the construction of such devices, and, with this object in view, I provide a single pedal-actuated control device for the throttle, and superimpose upon this a second device, adapted to be manually actuated, and operating directly upon the pedal.

Figure 1:
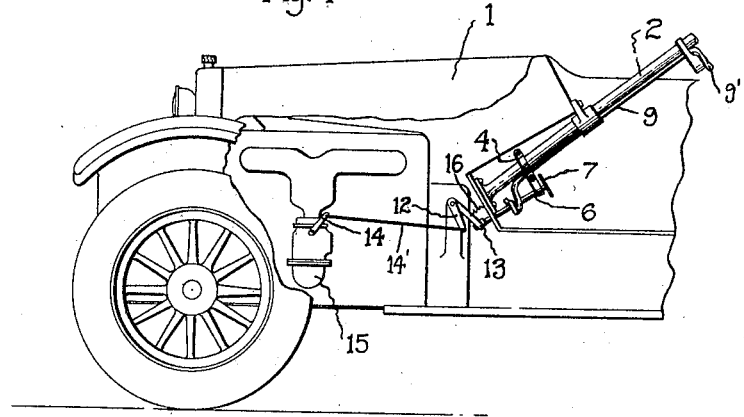
Figure 2:
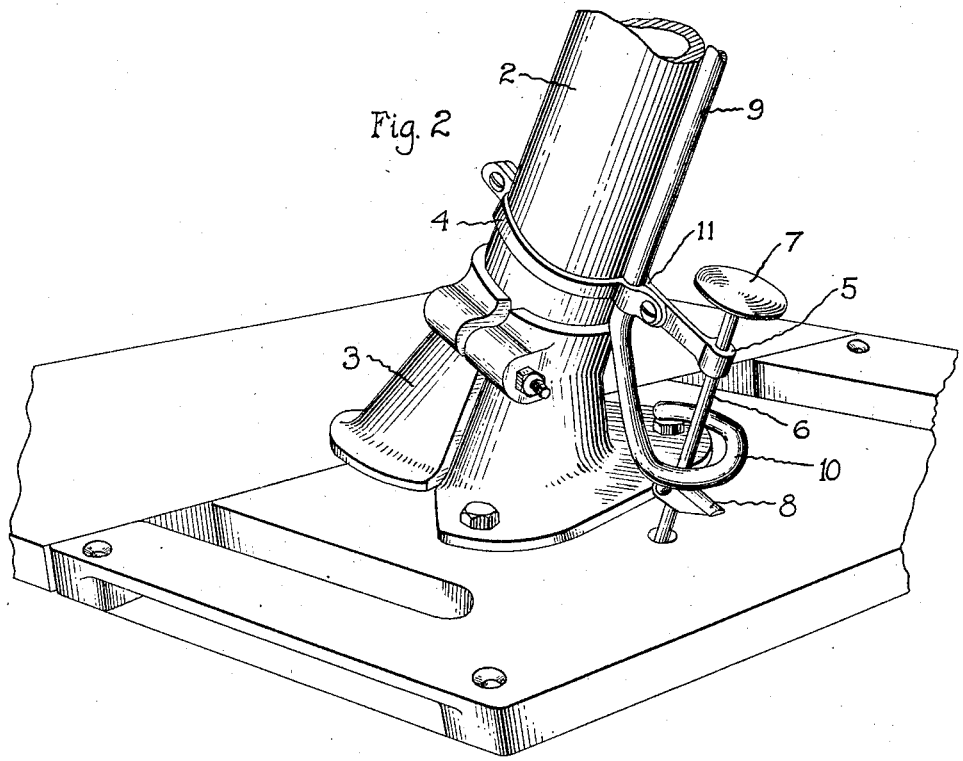

In the accompanying drawings, which form a part of this specification,

Fig. 1 is a view in elevation of portions of an automobile showing in connection therewith, certain features of one embodiment of my invention, and Fig. 2 is a perspective showing some details on an enlarged scale.

In the drawings, 1 indicates a motor vehicle of the type designed to be driven by an internal combustion engine, and 2 indicates the usual steering post, which may be secured to the vehicle, as by clamping means 3. On the steering post is mounted a bracket 4 provided with a bearing 5, for a rod 6, carrying a button 7, for engagement by the foot of the operator.

Upon the rod 6 is secured in any suitable manner, a bracket 8. A rod 9 rotatably mounted, preferably upon the steering post, as by bearings 11 in bracket 4, carries at its lower end a spirally bent portion 10 in the nature of a cam which is so positioned as to lie in co-operative relationship to bracket 8. The rod 9 will be provided at its upper end with a handle as 9', or any other desired form of operating means designed for manual actuation. Obviously the cam portion 10 may be replaced by a cam separately formed and secured to the rod.

The pedal rod 6 is connected in any usual or desired manner to the throttle lever 14 of carbureter 15, as by levers 12, 13, and link 14', and any usual means, as a spring 16, may be provided to return the parts toward the position in which the valve is closed.

It will be seen that the structure described permits of pedal actuation of the throttle without interference from the manual control means, due to the fact that the pedal is free to move downwardly. If, however, it be desired to substitute manual control, rotation of the rod 9 will cause the actuation of the pedal by the manually controlled means to the desired extent. It will be seen also that, irrespective of the position of the manual control means, the pedal is free for further actuation by the foot of the operator. Hence, the invention provides for setting the throttle by manual control at its position of minimum opening and still permits of further opening at will by the pedal without changing the adjustment of the manual control means.

It will be understood that other forms of connecting means capable of converting the movement of a manual control device into reciprocating movement of the pedal may be substituted for that shown, and that various other changes may be made in the details of construction without departing from the spirit and scope of the invention. Therefore, I do not desire to be limited to the specific structure described.

I claim:

1. The combination of a steering post, a reciprocating control pedal, means rotatively mounted upon the steering post and adapted for manual actuation, a bracket carried by said steering post and adapted to hold said means and said control pedal in proper relation with one another, and means upon the lower end of the first-mentioned means adapted to act directly upon the pedal to cause reciprocation thereof by rotation of said first-mentioned means.

2. The combination of a steering post, a control pedal, manually actuable means mounted upon the exterior of the post, a projecting element upon said pedal, and means on the lower end of said manually actuable means adapted to engage the upper surface of said projecting element and depress said pedal.

3. The combination of a steering post, a control pedal, a bracket mounted on said pedal, a rod rotatively mounted upon said post and adapted for manual actuation, the lower end of said rod being provided with a cam adapted to act upon the said bracket, and a bracket carried by said steering post and having bearings within which said control pedal and said rod operate.

4. The combination of a steering post, a reciprocating rod having a control pedal at its upper end; a bracket mounted on said rod; a rotating rod supported by said steering post and adapted to be manually operated and the lower end of which rod is bent to provide an inclined cam portion arranged adjacent the bracket aforesaid and adapted to actuate said first mentioned reciprocating rod; and a bearing carried by said steering post and within which said rotating rod is supported.

In testimony whereof I affix my signature.

WARREN H. FARR.